Sept. 16, 1924.                                                    1,508,509
L. F. DOUGLASS
METHOD OF MASKING PHOTOGRAPHIC FILM WHILE EXPOSURE IS BEING MADE
Filed July 15, 1922

INVENTOR
Leon F. Douglass
By J.E. Frabucco
Attorney.

Patented Sept. 16, 1924.

1,508,509

UNITED STATES PATENT OFFICE.

LEON F. DOUGLASS, OF MENLO PARK, CALIFORNIA.

METHOD OF MASKING PHOTOGRAPHIC FILM WHILE EXPOSURE IS BEING MADE.

Application filed July 15, 1922. Serial No. 575,310.

*To all whom it may concern:*

Be it known that I, LEON F. DOUGLASS, a citizen of the United States, and a resident of Menlo Park, in the county of San Mateo and State of California, have invented new and useful Improvements in the Methods of Masking Photographic Film While Exposure is Being Made, of which the following is a specification.

This invention relates to the method of masking photographic film while exposure is being made in a printing machine, and particularly pertains to the use of a masking means when printing from a negative to a positive film.

An object of my invention is to provide a convenient method for producing a plurality of separate scenes or images from separate negative films on a single positive film.

The invention is illustrated in the accompanying drawings in which.

Figure 4:
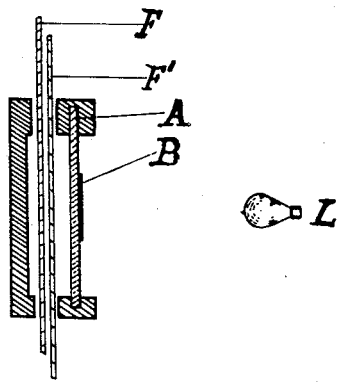
Fig. 4 is a sectional view of a portion of a printing machine, showing the relative arrangement of the negative and positive photographic films, the clear glass and an opaque member attached thereto.

In the drawings, A, is a rectangular piece of clear glass or a transparent celluloid which is so proportioned that it fits within a printing machine and covers one frame of the film or the entire surface of a plate. B and B' are opaque members, consisting of pieces of black cloth or other suitable materials which will not permit light rays to pass through them. B and B' are attached to A by means of glue or any other suitable adhesive, and are placed thereon in such a manner that the portion of the film upon which no exposure is to be made, is covered thereby. Figure 4, shows in section, a portion of a printing machine, in which the clear glass A, together with the opaque member B, are placed in printing position between the printing light L, and the negative film F'. Behind the negative film F' is placed the positive film F, upon which the titles or a plurality of different scenes or images are to be produced.

Figure 1:
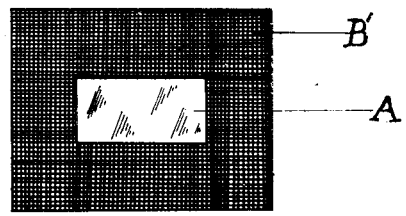
Fig. 1 is an elevation view showing the clear glass together with an opaque member attached thereto.
Figure 2:
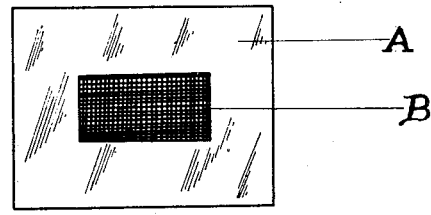
Fig. 2 is a similar view of the clear glass together with another opaque member of different shape attached thereto.
Figure 3:
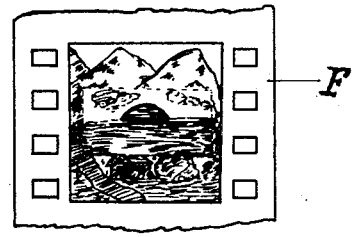
Fig. 3 is a diagrammatic fragment of a photographic film upon which are produced two images from two separate negatives by means of the clear glass and the opaque members shown in Figs. 1 and 2.

When two separate scenes or images are to be produced on a positive film, the opaque members B and B' are so formed or shaped that one exactly fits within the other, as shown in Figs. 1 and 2. Thus when exposure is being made to light L in a printing machine, a portion of the positive film F and one of the negatives will be covered by one of the opaque members, while in making a second exposure the positive film F and the other negative will be covered in such a manner by the other of the opaque members that the portions thereof which were not exposed by the previous exposure, will be subjected to the light rays from light L. Before exposing the positive film to the light rays from light L a second time, the opaque member B will be removed from clear glass A and the other opaque member B' will be placed thereon in such a position, that it will cover its surface except for the part thereof previously covered by opaque member B. Thus, by the first exposure the positive film F is exposed to light rays from light L except for the part thereof which is covered by opaque member B, while in the second exposure, the part thereof covered by opaque member B' is not exposed, and the part previously covered by B is exposed. In the first exposure one particular negative is employed so as to produce on the positive film F the scene appearing thereon, while in the second exposure a different negative is employed so as to produce a different scene thereon. Thus for instance, suppose it is desired to produce on a positive film, a scene showing the interior of a theatre in which a motion picture is being displayed. The positive film F and a negative, upon which appears the interior of a theatre scene, are inserted in the proper printing position within a printing machine. Opaque member B is attached to clear glass A, and placed thereon in such a position that the light rays from light L are not permitted to strike the part of the positive film F, upon which the motion picture screen is to appear. The clear glass A and the opaque member B are inserted in the printer, between light L and the negative F'. Then by exposure, the interior of the theatre is produced on positive film F, with an unexposed portion appearing thereon which is to be exposed on a second operation of the printing machine. After the first exposure, a second negative is selected, upon which appears any particular image or scene, and it, together with the positive film F are inserted within the printing machine, as before. The opaque member B is removed from clear glass A, and the other opaque member B' is attached thereto, care being taken to place it in a position which will exactly cover that portion of positive film F previously exposed, and still leave an opening covered originally by B. The clear glass A together with opaque member B' are inserted within the printer as before and an exposure of the positive is made. In the second printing operation the light rays are permitted to proceed through the opening previously covered by B, thereby producing a scene from the negative, on the part of the positive film where the motion picture screen is to appear. Thus by two exposures and by the use of the clear glass A, together with the opaque members B and B', two separate scenes are produced on a single positive film.

It is to be understood that I am not limited to any particular kind of clear glass for the attachment of the opaque members, as the same satisfactory results can be accomplished by using a transparent celluloid, upon which can be photographed the opaque members. Therefore the term "clear glass" is to be construed as applying to both transparent celludoid and glass, and "opaque members" is to be construed as applying to any substance or material which will not permit light rays to pass through it.

It is to be expressly understood that I am not limited to any particular kind or form of photography, as it is apparent that my invention may be used in connection with both still and motion photography or cinematography.

Having described my invention,

What I claim is:

1. The method of producing two separate images on a positive film which comprises, attaching an opaque member of particular shape to a transparent support adapted to cover one frame of the positive film, placing the opaque member and transparent support in the path of the light rays from a printing light, making a print from a selected negative film upon the positive film by means of the light rays passing through the transparent support and the selected negative film, removing the opaque member from the transparent support, and attaching thereto another opaque member adapted to mask the portion of the transparent support not masked by the first mentioned opaque member, interposing the last mentioned opaque member and transparent support in the path of the light rays proceeding from a printing light through another selected negative film to the positive film, and making an exposure of said positive film to the light rays passing through the transparent support and the second selected negative film.

2. The method of producing two separate scenes on a positive film which comprises, firstly masking portions of a positive film by means of an opaque member of particular shape supported by a transparent member and exposing the unmasked portions of the positive film to the light rays passing through the transparent member and a selected negative film, and secondly, masking the portions of the positive film previously exposed, by means of an opaque member of another particular shape supported by the transparent member, and exposing the positive film to the light rays passing through the transparent member and a second selected negative film.

3. The method of producing two separate images on a positive film which comprises inserting an opaque member of particular shape supported by a transparent member within a printing machine, exposing the positive film to the light rays proceeding through the transparent support and a selected negative film, substituting for the first mentioned opaque member another opaque member adapted to cover the portion of the transparent support not covered by the first opaque member, inserting the transparent support and the opaque member within the printing machine, and exposing the portions of the positive film not previously exposed to the light rays proceeding through the transparent support and a second selected negative film.

LEON F. DOUGLASS.